United States Patent
Friedrich et al.

(10) Patent No.: US 12,449,275 B2
(45) Date of Patent: Oct. 21, 2025

(54) METHOD AND APPARATUS FOR EVALUATING MAPS FOR AUTONOMOUS DRIVING AND VEHICLE

(71) Applicant: Bayerische Motoren Werke Aktiengesellschaft, Munich (DE)

(72) Inventors: Philipp Friedrich, Shanghai (CN); Qianshan Li, Shanghai (CN); Gary Lu, Shanghai (CN); Jenny Yuan, Shanghai (CN)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 219 days.

(21) Appl. No.: 17/794,739

(22) PCT Filed: Jan. 21, 2021

(86) PCT No.: PCT/EP2021/051286
§ 371 (c)(1),
(2) Date: Jul. 22, 2022

(87) PCT Pub. No.: WO2021/148510
PCT Pub. Date: Jul. 29, 2021

(65) Prior Publication Data
US 2023/0060542 A1    Mar. 2, 2023

(30) Foreign Application Priority Data
Jan. 23, 2020    (CN) .......................... 202010076138.5

(51) Int. Cl.
*G01C 21/00*    (2006.01)
*B60W 60/00*    (2020.01)

(52) U.S. Cl.
CPC ....... *G01C 21/3867* (2020.08); *B60W 60/001* (2020.02); *G01C 21/3819* (2020.08); *B60W 2552/53* (2020.02)

(58) Field of Classification Search
CPC ............ G01C 21/3867; G01C 21/3819; G01C 21/3407; B60W 60/001; B60W 2552/53
See application file for complete search history.

(56) References Cited

U.S. PATENT DOCUMENTS

2018/0181817 A1    6/2018    Yan et al.
2019/0251373 A1    8/2019    Lee et al.

FOREIGN PATENT DOCUMENTS

| CN | 105260699 A | 1/2016 |
| CN | 106767853 A | 5/2017 |

(Continued)

OTHER PUBLICATIONS

Machine Translation of CN109724615A (Year: 2019).*

(Continued)

*Primary Examiner* — Sahar Motazedi
(74) *Attorney, Agent, or Firm* — Crowell & Moring LLP

(57) ABSTRACT

A method and apparatus evaluates a map for autonomous driving. The method acquires pixel points of lane lines of a road in a static map; acquires pixel points of lane lines of the road in a real-time map; forms first fitted curves of the lane lines in the static map by fitting the acquired pixel points of the lane lines in the static map respectively; forms second fitted curves of the lane lines in the real-time map by fitting the acquired pixel points of the lane lines in the real-time map respectively; calculates fitted-curve-similarities between the first fitted curves and the corresponding second fitted curves; and evaluates the consistency of the static map and the real-time map based on the fitted-curve-similarities.

20 Claims, 8 Drawing Sheets

(56) References Cited

FOREIGN PATENT DOCUMENTS

| | | | |
|---|---|---|---|
| CN | 106918342 A | | 7/2017 |
| CN | 107590438 A | | 1/2018 |
| CN | 108413971 A | | 8/2018 |
| CN | 109581449 A | | 4/2019 |
| CN | 109724615 A | * | 5/2019 |
| CN | 110155053 A | | 8/2019 |
| CN | 110645996 A | | 1/2020 |
| EP | 3 524 936 A1 | | 8/2019 |
| WO | WO 2019/207160 A1 | | 10/2019 |

OTHER PUBLICATIONS

International Search Report (PCT/ISA/210) issued in PCT Application No. PCT/EP2021/051286 dated May 14, 2021 (three (3) pages).

Written Opinion (PCT/ISA/237) issued in PCT Application No. PCT/EP2021/051286 dated May 14, 2021 (three (3) pages).

English translation of Chinese-language Office Action issued in Chinese Application No. 202010076138.5 dated Aug. 2, 2023 (10 pages).

* cited by examiner

METHOD AND APPARATUS FOR EVALUATING MAPS FOR AUTONOMOUS DRIVING AND VEHICLE

TECHNICAL FIELD

The present disclosure relates to the field of autonomous driving, and in particular, to a method and an apparatus for evaluating a map for autonomous driving and a vehicle.

BACKGROUND AND SUMMARY

Autonomous driving is a main subject of current vehicle research. The prerequisite of autonomous driving is to clarify a road network on which a vehicle is traveling and to sense an environment around the vehicle, so that the road network involved as well as objects and other traffic participants in the environment may be identified. One way for the identification is to obtain data from the road network and sense distances from objects around the vehicle to the vehicle by using a camera and a LiDAR.

At present, regarding classification of autonomous driving, the SAE (International Society of Automotive Engineers) standard is generally accepted internationally, which is divided into six levels, i.e., L0-L5. L0 means that a vehicle is completely in manual operation, and a driving assistance apparatus only provides some auxiliary warnings and signals, such as radar reminders for reversing and distance reminders for driving. L1 means that some lateral or longitudinal auxiliary functions are involved in driving operations; the functions may be called as assistance driving, such as an adaptive cruise, an autonomous emergency braking, etc., that is, the apparatus begins to actively control the vehicle. L2 means that the apparatus may implement lateral and longitudinal autonomous driving of the vehicle, while the driver must always maintain attention on the vehicle and always be ready to take over the driving of the vehicle. L3 mean that a high degree of machine operation is achieved in the autonomous driving, and the driver may completely give up a control on the vehicle while may need to take over the vehicle only in a few cases. L4 means that the steering wheel of the vehicle may completely disappear. That is, there is a huge gap between L3 and L4: in L3, the apparatus needs to consider human-machine coordination and switching between human operation and machine operation, while in L4, the apparatus does not consider human intervention in an operation of the vehicle. L5 is the highest level, in which road vehicles are fully intelligent.

With the development of autonomous driving technology, higher requirements are provided on the real-time and accuracy of maps for autonomous driving.

Therefore, an object of the present disclosure is to provide a method and an apparatus for improving autonomous driving of vehicle, as well as a vehicle.

According to a first aspect of the present disclosure, a method for evaluating a map for autonomous driving is provided. The method includes:
  acquiring pixel points of lane lines of a road in a static map;
  acquiring pixel points of lane lines of the road in a real-time map;
  forming first fitted curves of the lane lines in the static map by fitting the acquired pixel points of the lane lines in the static map respectively;
  forming second fitted curves of the lane lines in the real-time map by fitting the acquired pixel points of the lane lines in the real-time map respectively;
  calculating fitted-curve-similarities between the first fitted curves and the corresponding second fitted curves; and
  evaluating the consistency of the static map and the real-time map based on the fitted-curve-similarities.

According to the present disclosure, the method for evaluating a map for autonomous driving may be applied to autonomous driving vehicle manufacturers, static map or real-time map providers, etc., to improve the reliability and safety of autonomous driving.

In some embodiments, the step of "calculating fitted-curve-similarities between the first fitted curves and the corresponding second fitted curves" includes:
  calculating parallelisms between the first fitted curves and the corresponding second fitted curves; and/or
  calculating intersection areas between the first fitted curves and the corresponding second fitted curves.

In some embodiments, the method further includes:
  evaluating lane consistency between a lane, preferably an ego car lane, in the static map and a lane, preferably an ego car lane, in the real-time map, especially consistency of lateral parameters of the lanes, the lateral parameters of the lanes including lateral sizes of the lanes, pixel values and/or numbers of the pixel points of the lanes in a lateral direction, and
  evaluating the consistency of the static map and the real-time map based on the lane consistency and fitted-curve-similarities.

In some embodiments, the step of "evaluating the lane consistency between the ego car lane in the static map and the ego car lane in the real-time map" includes:
  determining the ego car lane based on position coordinates of the ego car;
  acquiring pixel points of a baseline, such as a centerline, within the ego car lane in the static map;
  calculating first distances from the pixel points of the baseline, such as the centerline, to the lane line of the ego car lane in the static map in a first direction, for example, in a normal direction, respectively;
  calculating second distances from the pixel points of the baseline, such as the center line, to the lane line of the ego car lane in the real-time map in the first direction, respectively;
  calculating the cosine similarity between first vectors constituted by the first distances and second vectors constituted by the second distances; and
  evaluating the lane consistency based on the acquired cosine similarity.

In some embodiments, the step of "evaluating the lane consistency between the ego car lane in the static map and the ego car lane in the real-time map" includes:
  determining the ego car lane based on position coordinates of the ego car;
  acquiring pixel points of the ego car lane in the static map;
  acquiring pixel points of the ego car lane in the real-time map;
  acquiring pixel points of a baseline, such as a centerline, in the ego car lane in the static map;
  determining first segments from the pixel points of the baseline, such as the centerline, to the lane line of the ego car lane in the static map in a first direction, for example, in a normal direction, respectively;
  determining second segments from the pixel points of the baseline, such as the center line, to the lane line of the ego car lane in the real-time map in the first direction, respectively;
  ascertaining deviations, especially deviations of the pixel values and/or deviations of pixel coordinates, between the pixel points in the first segments and the corresponding pixel points in the second segments;
evaluating the lane consistency based on the ascertained deviations.

In some embodiments, the step of "acquiring pixel points of the ego car lane in the real-time map" includes:
extracting corresponding pixel points from the real-time map based on the pixel coordinates of the pixel points of the ego car lane in the static map, to serve as the pixel points of the ego car lane in the real-time map.

In some embodiments, the method further includes: processing the real-time map with a clustering process before acquiring pixels points of lane lines of the road in the real-time map, so as to classify part of the pixel points as lane line pixel points while classifying the other part of pixel points as noise pixel points.

In some embodiments, the method further includes: adjusting an autonomous driving plan for the ego car based on evaluation results of the consistency between the static map and the real-time map, and/or feeding the evaluation results of the consistency back to static map providers and/or real-time map providers.

In some embodiments, the step of "adjusting an autonomous driving plan for the ego car based on evaluation results of the consistency between the static map and the real-time map" includes:
determining road sections that are evaluated as inconsistent road sections in the static map and the real-time maps
ascertaining the relevance of current autonomous driving plan to the road sections;
adjusting the autonomous driving plan for the ego car based on the ascertained road sections, if the current autonomous driving plan involves the road sections that are evaluated as inconsistent road sections.

According to a second aspect of the present disclosure, an apparatus for evaluating a map for autonomous driving is provided. The apparatus includes:
a storage module configured to store data of a real-time map and a static map;
a control module configured to:
acquire pixel points of lane lines of a road in the static map from the storage module;
acquire pixel points of lane lines of the road in the real-time map from the storage module;
form first fitted curves of the lane lines in the static map by fitting the acquired pixel points of the lane lines in the static map respectively;
forming second fitted curves of the lane lines in the real-time map by fitting the acquired pixel points of the lane lines in the real-time map respectively;
calculate fitted-curve-similarities between the first fitted curves and the corresponding second fitted curves; and
evaluate consistency of the static map and the real-time map based on the fitted-curve-similarities.

In some embodiments, the control module is configured to calculate the fitted-curve-similarities by calculating parallelisms and/or intersection areas between the first fitted curves and the corresponding second fitted curves.

In some embodiments, the control module is configured to: evaluate lane consistency between a lane, preferably an ego car lane, in the static map and a lane, preferably an ego car lane, in the real-time map, especially consistency of lateral parameters of the lanes which include lateral sizes of the lanes, pixel values and/or numbers of the pixel points of the lanes in a lateral direction, and evaluate consistency of the static map and the real-time map based on the lane consistency and fitted-curve-similarities.

In some embodiments, the control module is configured to:
determine the ego car lane by acquiring position coordinates of the ego car;
acquire pixel points of a baseline, such as a centerline, within the ego car lane in the static map from the storage module;
calculate first distances from the pixel points of the baseline, such as the centerline, to the lane line of the ego car lane in the static map in a first direction, for example, in a normal direction, respectively;
calculate second distances from the pixel points of the baseline, such as the center line, to the lane line of the ego car lane in the real-time map in the first direction, respectively;
calculate cosine similarities between first vectors constituted by the first distances and second vectors constituted by the second distances; and
evaluate the lane consistency based on the acquired cosine similarities; and/or the control module is configured to:
determine the ego car lane based on position coordinates of the ego car;
acquire pixel points of the ego car lane in the static map;
acquire pixel points of the ego car lane in the real-time map;
acquire pixel points of a baseline, such as a centerline, within the ego car lane in the static map;
determine first segments from the pixel points of the baseline, such as the centerline, to the lane line of the ego car lane in the static map in a first direction, for example, in a normal direction, respectively;
determine second segments from the pixel points of the baseline, such as the center line, to the lane line of the ego car lane in the real-time map in the first direction, respectively;
ascertain deviations, especially deviations of the pixel values and/or deviations of pixel coordinates, between the pixel points in the first segment and the corresponding pixel points in the second segment;
evaluate the lane consistency based on the ascertained deviations.

In some embodiments, the control module is configured to: send a control instruction based on evaluation results of the consistency between the static map and the real-time map, the control instruction prompting adjustment of an autonomous driving plan for the ego car and/or feed the evaluation results of the consistency back to static map providers and/or real-time map providers,
preferably, the control module is configured to:
determine road sections that are evaluated as inconsistent road sections in the static map and the real-time map;
ascertain the relevance of the current autonomous driving plan to the road sections;
send a control instruction that promotes adjustment of the autonomous driving plan for the ego car based on the ascertained road sections, if the current autonomous driving plan involves the road sections that are evaluated as inconsistent road sections.

According to a third aspect of the present disclosure, a vehicle including any apparatus according to embodiments of the present disclosure is provided.

According to a fourth aspect of the present disclosure, a processing device for evaluating a map for autonomous driving is provided. The processing device includes:
one or more processors; and one or more memories configured to store a series of computer-executable instructions and computer-accessible data associated with the series of computer-executable instructions, wherein the series of computer-executable instructions, when executed by the one or more processors, cause the one or more processors to perform operations described in any one of the embodiments of the first aspect of the present disclosure.

According to a fifth aspect of the present invention, a non-transitory computer-readable storage medium is provided. The non-transitory computer-readable storage medium is stored with a series of computer-executable instructions, wherein the series of computer-executable instructions, when executed by one or more computing devices, cause the one or more computing devices to perform operations described in any one of the embodiments of the first aspect of the present disclosure.

In the following, some examples of the apparatus and/or the method are illustrated with reference to the accompanying drawings.

DETAILED DESCRIPTION OF THE DRAWINGS

Figure 1:
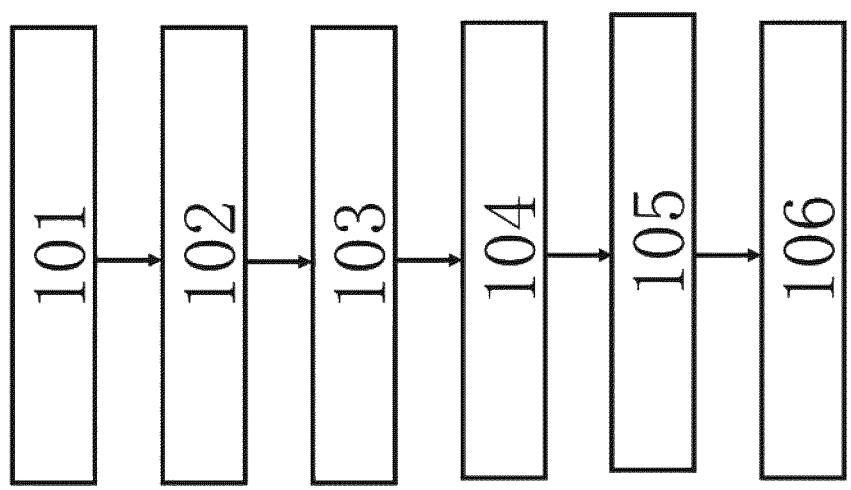
FIG. 1 is an exemplary flow chart of a method for evaluating a map for autonomous driving.

Embodiments of the present disclosure will be described below with reference to the drawings, in which several embodiments of the present disclosure are shown. It should be understood, however, that the present disclosure may be implemented in many different ways, and is not limited to the example embodiments described below. In fact, the embodiments described hereinafter are intended to make the present disclosure to be more complete and to adequately explain the scope of the present disclosure to a person skilled in the art. It should also be understood that, the embodiments disclosed herein may be combined in various ways to provide many additional embodiments.

It should be understood that, the wording in the present disclosure is only used for describing particular embodiments and is not intended to limit the present disclosure. All the terms used in the specification (including technical and scientific terms) have the meanings as normally understood by a person skilled in the art, unless otherwise defined. For the sake of conciseness and/or clarity, well-known functions or constructions may not be described in detail.

The term "A or B" used through the present disclosure refers to "A and B" and "A or B" rather than meaning that A and B are exclusive, unless otherwise specified.

The term "exemplary", as used herein, means "serving as an example, instance, or illustration". Any implementation described herein as exemplary is not necessarily to be construed as preferred or advantageous over other implementations. Furthermore, there is no intention for the present disclosure to be bound by any expressed or implied theory presented in the part of technical field, the background art, the content of the disclosure or the embodiments.

Herein, certain terminology, such as the terms "first", "second" and the like, may also be used in the following specification for the purpose of reference only, and the terms "first", "second" may refer to multiple "first", "second". For example, the terms "first", "second" and other such numerical terms referring to structures or elements do not imply a sequence or order unless clearly indicated by the context.

Further, it should be noted that, the terms "comprise", "include", "have" and any other variants, as used herein, specify the presence of stated features, unity, steps, operations, elements, and/or components, but do not preclude the presence or addition of one or more other features, unities, steps, operations, elements and/or components, and/or groups thereof. Unless otherwise defined, all terms (including technical and scientific terms) are used herein according to their ordinary meanings in the field to which the examples belong.

It should be noted that the order of the steps of the methods in the present disclosure may be set flexibly, and numbers marking the steps are only for convenience of specification and have no limiting effect.

It should be pointed out that the sequence of the steps in this article may be flexibly configured, and the steps are marked by numbers for convenience of description and not restrictive.

FIG. 1 is an exemplary flowchart of a method for evaluating a map for autonomous driving. According to the present disclosure, the method includes:

in step 101: pixel points of lane lines of a road in a static map are acquired;

in step 102: pixel points of lane lines of the road in a real-time map are acquired;

in step 103: first fitted curves of the lane lines in the static map are formed by fitting the acquired pixel points of the lane lines in the static map respectively;

in step 104: second fitted curves of the lane lines in the real-time map are formed by fitting the acquired pixel points of the lane lines in the real-time map respectively;

in step 105: fitted-curve-similarities between the first fitted curves and the corresponding second fitted curves are calculated; and in step 106: the consistency of the static map and the real-time map is evaluated based on the fitted-curve-similarities.

The method for evaluating a map for autonomous driving may be applied to autonomous driving vehicle manufacturers, static map or real-time map providers, etc., to improve the reliability and safety of autonomous driving. The autonomous driving vehicle (also known as an ego car) herein may be a mobile transportation means with autonomous driving function, which may be a car, passenger car, truck, lorry, train, ships, motorcycles, tricycles, two-wheelers, or other movable means of transportation.

The static map may be a "high-precision (HD) map" or a "planning map". The static map for autonomous driving may usually be an electronic digital map with higher accuracy and more data dimensions. However, current static maps are usually made in advance by map providers, and mainly include predefined map information based on offline data. Therefore, real-time lane information and/or real-time road conditions on the road may not be presented on the static map.

The real-time map may be a map generated by means of data detected in real time by various sensing devices installed on the vehicle. Therefore, the real-time map may present real-time lane information and/or real-time road conditions on the road. These sensing devices may be cameras, radars and/or LiDARs. The camera may be a video camera, a high-speed camera, or a still image camera. The camera data may be the raw output of the camera. Alternatively, the camera data may be preprocessed data of the camera. For example, camera data may contain multiple image frames. An image frame of the plurality of image frames may include a plurality of pixel points, for example, a plurality of pixel points in a two-dimensional arrangement. In addition, the camera data may include image information, for example, color information of each pixel of the image information.

LiDAR may be configured to obtain LiDAR data by emitting light (for example, pulsed laser) and measuring a portion of the light reflected from objects near the LiDAR. The LiDAR data may contain information such as target distance, azimuth, altitude, speed, attitude, and even shape. For example, the LiDAR data may include a point cloud of distance information, and the distance information may include information (distance value) related to distances from multiple points (of the point cloud) to the LiDAR.

Generally, pixel points in static maps and real-time maps may include their own pixel coordinates and pixel values (for example, RGB values). Static maps and real-time maps may employ different colors to indicate different objects in a road area. For example, a lane line may be marked in green, a center line of a lane may be marked in yellow, and a lane itself may be marked in blue.

In some embodiments, the static map may have background pixels. Therefore, before obtaining pixel points of lane lines of a road in the static map, a road area of interest may be obtained by filtering out the background pixels. Similarly, the real-time map may also have background pixels, so before obtaining pixel points of lane lines of a road in the real-time map, a road area of interest may be obtained by filtering out the background pixels.

In some embodiments, the real-time map may be accompanied by more noise pixel points, which may interfere with subsequent method steps, such as the curve fitting step 104 and the fitted-curve-similarity calculation step 105, thereby reducing the accuracy and reliability of the evaluation. Therefore, before acquiring pixel points of lane lines of a road in the real-time map, the real-time map may be performed by a clustering process, so as to classify a part of pixel points thereof as lane line pixel points and another part of the pixel points as noise pixels point. These noisy pixel points may be set as a background color and filtered out, so as to further reduces the interference effect of noise on subsequent method steps and improves the accuracy and reliability of the method.

The clustering process may be implemented as follows: in a first step, a certain pixel point in the real-time map is selected as a center and a circle is made with a predetermined radius; in a second step, a number of the pixel points with a pixel value deviation from the center of the circle less than a threshold (for example, the Euclidean distance between two pixel points may be considered here) is calculated, and if the number exceeds a predetermined threshold (for example, 600), then points in the circle are regarded as the same cluster; in a third step, the points in the circle are took as a center of a circle in turn or optionally, and this circle is made with a predetermined radius; in a fourth step, the second step are repeated until the pixel points are traversed and no circle may be expanded outward. Finally, through the above steps, respective pixel points in the real-time map may be clustered to obtain a more accurate pixel point group of different objects in the road area (lane line, lane center line, and lane itself).

In some embodiments, pixel points of lane lines of a road in a static map may be acquired by means of an edge detection algorithm. For example, pixel points of a lane line may be determined by searching for boundary points of which pixels changes. Similarly, pixel points of lane lines of the road in a real-time map may also be acquired by means of an edge detection algorithm. For example, pixel points of a lane line may be determined by searching for boundary points of which pixels changes in the real-time map after clustering process.

In other embodiments, in a case that the real-time map has been evaluated as highly accurate, the above clustering process step may be unnecessary when the real-time map is accompanied by less noisy pixels.

Figure 2A:
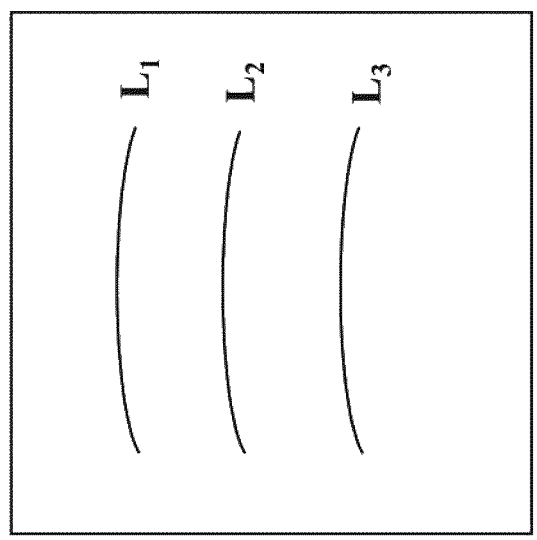
FIG. 2a and FIG. 2b are schematic diagrams of a first embodiment of calculating fitted-curve-similarities.
Figure 2B:
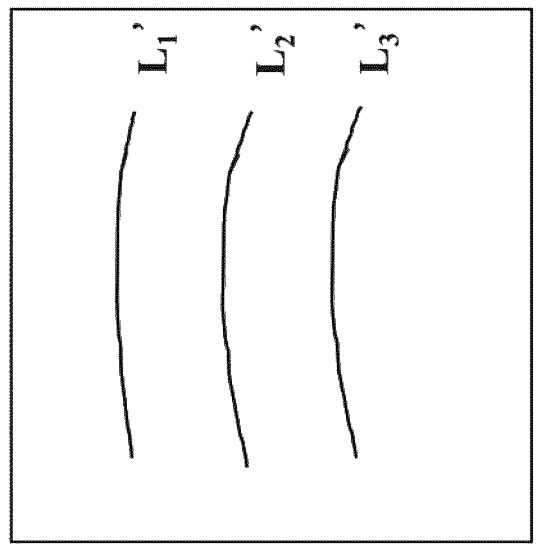
Figure 3:
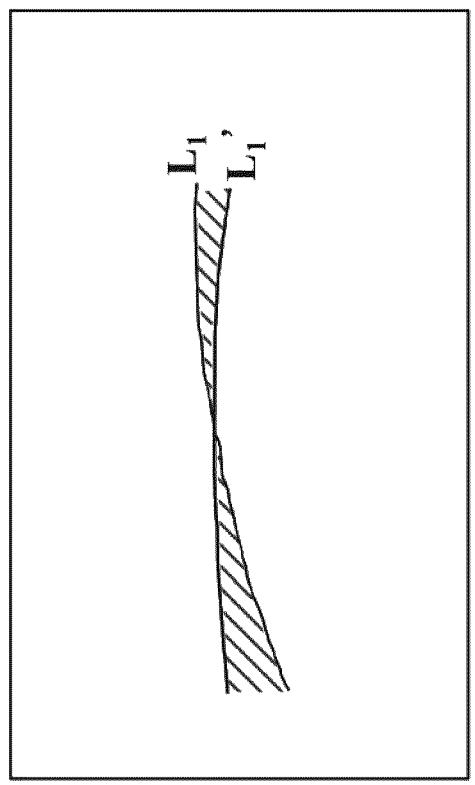
FIG. 3 is a schematic diagram of a second embodiment for calculating fitted-curve-similarities.

Next, with reference to FIG. 2a, FIG. 2b, and FIG. 3, schematic diagrams of two embodiments of calculating fitted-curve-similarities are described in detail.

As shown in FIG. 2a and FIG. 2b, FIG. 2a exemplarily shows three lane lines $L_1$, $L_2$, $L_3$ of a road in the static map; FIG. 2b exemplarily shows three lane lines $L_1'$, $L_2'$, $L_3'$ of a road in the real-time map. A fitting is performed by fitted curves respectively after selecting several pixel points from each of lane lines $L_1$, $L_2$, $L_3$ and $L_1'$, $L_2'$, $L_3'$.

As an example, each lane line may be represented by means of a polynomial fitted curve, such as the following quadratic function:

$$L_1 = a_1 x^2 + b_1 x + c_1;$$

$$L_1' = a_1' x^2 + b_1' x + c_1';$$

$$L_2 = a_2 x^2 + b_2 x + c_2;$$

$$L_2' = a_2' x^2 + b_2' x + c_2';$$

$$L_3 = a_3 x^2 + b_3 x + c_3;$$

$$L_3' = a_3' x^2 + b_3' x + c_3'.$$

In order to calculate the fitted-curve-similarity between the first fitted curve and the corresponding second fitted curve, the parallelism between the first fitted curve and the corresponding second fitted curve may be calculated. In some embodiments, the parallelism between a lane line $L_1$ in the static map and the corresponding lane line $L_1'$ in the real-time map may be calculated by the following formula: $K = \frac{1}{3}(a_1/a_1' + b_1/b_1' + c_1/c_1')$. When K is within a predefined threshold range, for example (0.9, 1), then the first fitted curve and the corresponding second fitted curve may be considered as similar; otherwise, the two curves may be considered as dissimilar. The parallelism of other lane lines $L_2$, $L_2'$ and $L_3$, $L_3'$ may also be similarly calculated.

In other embodiments, a linear function or a higher order function may also be adopted to fit the lane lines. In order to calculate the parallelism between the first fitted curve and the corresponding second fitted curve, other suitable methods may also be adopted. For example, differences between each pair of coefficients $a_1$, $a_1'$; $b_1$, $b_1'$; $c_1$, $c_1'$ are compared, when the difference is within a set threshold range, it may be considered that the first fitted curve and the corresponding second fitted curve are similar; otherwise, it may be considered that the two curves are dissimilar.

In addition, in order to calculate the fitted-curve-similarity between the first fitted curve and the corresponding second fitted curve, an intersection area between the first fitted curve and the corresponding second fitted curve may also be calculated. As shown in FIG. 3, it exemplarily shows a chart in which a lane line $L_1$ in the static map and the corresponding lane line $L_1'$ in the real-time map are in the same coordinate system. To this end, the intersection area between the two curves $L_1$ and $L_1'$ may be calculated (for example, by integral calculation). When the intersection area is less than a set threshold, it may be considered that the first fitted curve and the corresponding second fitted curve are similar; otherwise, it may be considered that the two curves are dissimilar.

According to the present disclosure, when evaluating the consistency between the static map and the real-time map, the shape consistency of the lane, especially the ego car lane, between the static map and the real-time map may be additionally considered, so as to further identify the translation, rotation, and/or shape deformation, especially the shape deformation in the lateral direction between the static map and the real-time map, thereby improving the reliability and accuracy of the evaluation conclusion.

Figure 4:
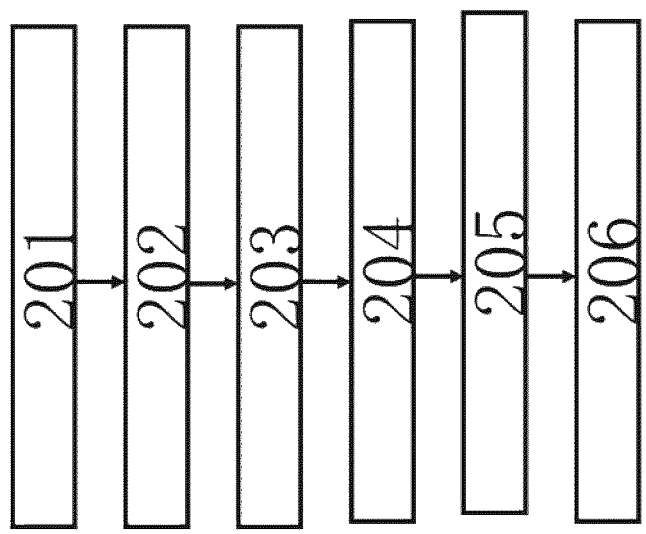
FIG. 4 is an exemplary flow chart of a method for evaluating lane consistency.
Figure 5:
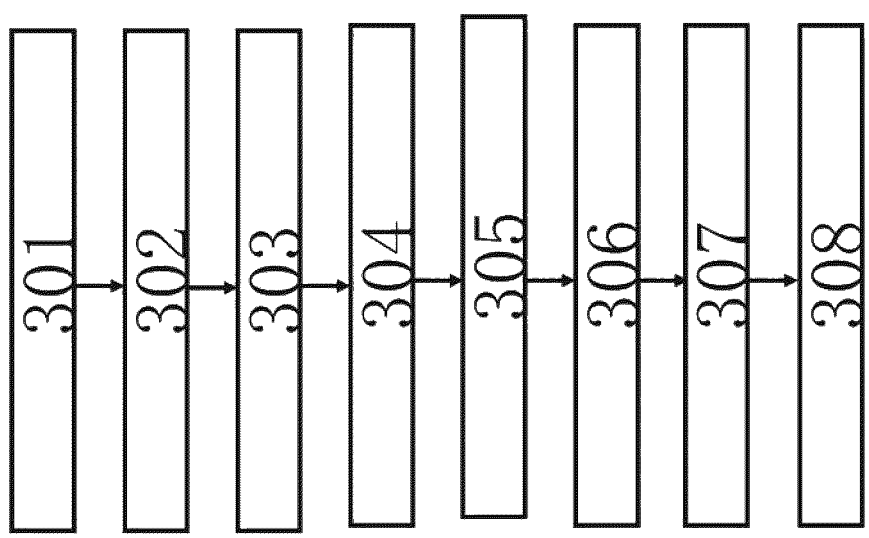
FIG. 5 is an exemplary flow chart of a method for evaluating lane consistency.

FIG. 4 and FIG. 5 show two exemplary flow charts for evaluating the lane consistency, such as the lane shape consistency, especially the lane lateral parameter consistency, between the ego car lane in the static map and the ego car lane in the real-time map. The lane parameter should be understood as the parameter of the road body between the lane lines of the lane. The lane lateral parameter should be understood as a lane parameter in a direction at an angle to the lane line, which are not limited to lane parameters in the vertical direction. The lane lateral parameter may include the lateral size of the lane, the pixel value and/or the number of pixel points in the lateral direction of the lane, and so on.

In the flow chart of FIG. 4, method steps for evaluating lane consistency may include:
 in step 201: an ego car lane is determined based on position coordinates of the ego car;
 in step 202: pixel points of a baseline, such as a centerline, within the ego car lane in the static map are acquired;
 in step 203: first distances from the pixel points of the baseline, such as the centerline, to the lane line of the ego car lane in the static map in a first direction, for example in a normal direction, are calculated respectively;
 in step 204: second distances from the pixel points of the baseline, such as the center line, to the lane line of the ego car lane in the real-time map in the first direction are calculated respectively;
 in step 205: the cosine similarity between first vectors constituted by the first distances and second vectors constituted by the second distances are calculated; and
 in step 206: the lane consistency is evaluated based on the acquired cosine similarity.

In step 201, the coordinates of the ego car in the map may be acquired through coordinate transformation based on the positioning information (the current location coordinates) of the ego car, so as to determine the ego car lane, that is, the lane where the ego car is currently traveling.

In order to evaluate lane consistency, it is necessary to consider the translation, rotation and/or shape deformation of the lane in the static map and the real-time map. For this purpose, the baseline in the lane, especially in the ego car lane, for example, the distance between the center line and the lane line of the lane may be considered, so as to acquire information about the deformation or displacement in the lateral direction of the lane.

Figure 6:
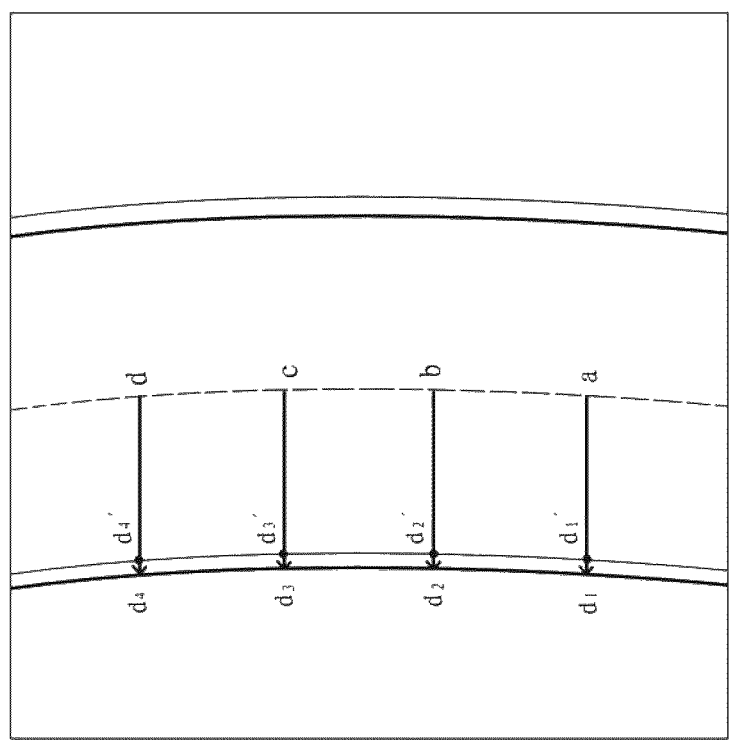
FIG. 6 is a schematic diagram of a first embodiment of calculating lane consistency.

As shown in FIG. 6, the lane line of the ego car lane of the static map is represented by a thick solid line; the lane line of the ego car lane of the real-time map is represented by a thin solid line; and the center line of the ego car lane of the static map is represented by a dotted line. It may be seen that the ego car lane of the static map and the ego car lane of the real-time map do not completely overlap with each other, and the two lanes have spatial translation and a certain degree of lane shape deformation therebetween. In order to evaluate this situation, the lateral size consistency of the lanes needs to be considered.

In the embodiment of FIG. 6, the method of cosine similarity is employed to measure the lane consistency, specifically: the baseline is selected at first, usually the center line of the ego car lane of the static map is selected as the baseline; then several pixel points a, b, c, d of the center line are sampled; next the normal direction of these pixel points are determined and the first distances $d_1$, $d_2$, $d_3$, $d_4$ of these pixel points to the lane line of the ego car lane of the static map are calculated respectively; then the second distances $d_1'$, $d_2'$, $d_3'$, $d_4'$ of these pixel points to the lane line of the ego car lane of the real-time map are calculated; a first vector A ($d_1$, $d_2$, $d_3$, $d_4$) is acquired based on the calculated first distances and a second vector B ($d_1'$, $d_2'$, $d_3'$, $d_4'$) is acquired based on the calculated second distances; finally the cosine similarity $$\cos(\theta) = \frac{A \cdot B}{\|A\|\|B\|}$$

between the first vector formed by the first distances and the second vector formed by the second distances are calculated, and when the cosine similarity is greater than a predetermined threshold, it may be considered that the ego car lanes in the static map and the real-time map are similar. In other embodiments, in addition to considering the lane consistency of the ego car lane, the lane consistency of other lanes may also be considered, especially those lanes involved in a driving plan of the ego car.

In the flow chart of FIG. 5, method steps for evaluating lane consistency may include:
 in step 301: an ego car lane is determined based on position coordinates of the ego car;
 in step 302: pixel points of the ego car lane in the static map are acquired;
 in step 303: pixel points of the ego car lane in the real-time map are acquired;
 in step 304: pixel points of a baseline, such as a centerline, within the ego car lane in the static map are acquired;
 in step 305: first segments from the pixel points of the baseline, such as the centerline, to the lane line of the ego car lane in the static map in a first direction, for example in a normal direction, are determined respectively;
 in step 306: second segments from the pixel points of the baseline, such as the center line, to the lane line of the ego car lane in the real-time map in the first direction are determined respectively;
 in step 307: deviations, especially deviations of the pixel values and/or deviations of pixel coordinates, between the pixel points in the first segments and the corresponding pixel points in the second segments are ascertained;

in step 308: the lane consistency is evaluated based on the ascertained deviations.

In step 301, the coordinates of the ego car in the map may be acquired through coordinate transformation based on the positioning information (the current location coordinates) of the ego car, so as to determine the ego car lane, that is, the lane where the ego car is currently traveling.

In step 302, the pixel points of the ego car lane may be directly acquired from the static map.

In step 303, the pixel points of the ego car lane may also be directly acquired from the real-time map. However, in some embodiments, corresponding pixel points may also be extracted from the real-time map based on the pixel coordinates of the pixel points of the ego car lane in the static map and used as the pixel points of the ego car lane in the real-time map. That is, according to the pixel coordinates of the lane line of the ego car lane in the static map, the pixel points on the corresponding pixel coordinates in the real-time map are extracted, and these extracted pixel points may represent the ego car lane in the real-time map. This is advantageous when a prediction result of the real-time map or the quality of the real-time map is average, the reason is that the ego car lane may not be accurately extracted due to usually accompanied larger noise points if the extraction is directly performed based on the positioning of the ego car.

It may be seen from FIG. 6 that, the ego car lane of the static map and the ego car lane of the real-time map do not completely overlap, and the two lanes have spatial translation and a certain degree of lane shape deformation therebetween. In order to evaluate this situation, it may also be necessary to consider the lane lateral parameter consistency, for example, the pixel value consistency of pixel points in the lateral direction of the lane.

Figure 7:
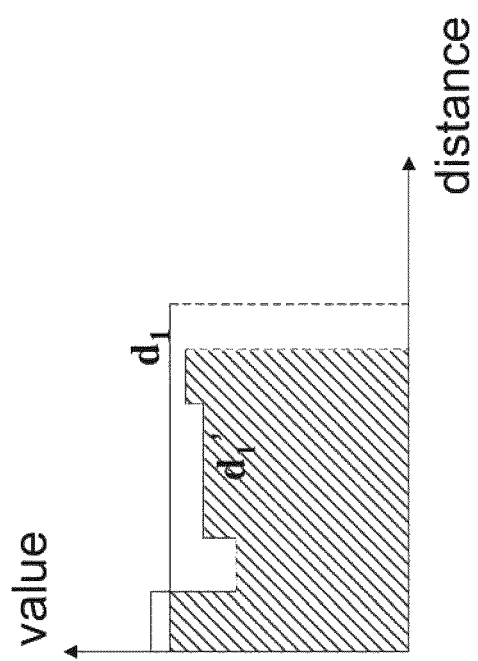
FIG. 7 is a schematic diagram of a second embodiment of calculating lane consistency.

In the embodiment of FIG. 7, the uniform distribution method is employed to measure the lane consistency, specifically: the baseline is selected at first, usually the center line of the ego car lane of the static map is selected as the baseline; then several pixel points a, b, c, d of the center line are sampled; next the normal direction of these pixel points are determined and first segments $d_1$ of these pixel points to the lane line of the ego car lane of the static map along the normal direction respectively; second segments $d_1'$ of these pixel points to the lane line of the ego car lane of the real-time map along the normal direction respectively; then deviations, especially deviations of the pixel values and/or deviations of pixel coordinates, between the pixel points in the first segments and the corresponding pixel points in the second segments are ascertained.

In the embodiment of FIG. 7, the uniform distribution of the pixel points in the first segments $d_1$ of the static map and the pixel points in the second segment $d_1'$ of the real-time map may be considered. For this reason, the pixel values of the pixel points in the first segments $d_1$ of the static map are regarded as the ground truth values and therefore are normalized to "1", and the normalized values of the pixel values of the corresponding pixel points in the real-time map are calculated (for example, a reference may be made to the Euclidean distance between two corresponding pixel points). It may be seen from FIG. 7 that some pixel points in the second segment $d_1'$ are higher than 1, some pixel points are lower than 1, and there is a lateral translation between the second segment $d_1'$ and the first segment $d_1$. In order to evaluate the lane consistency, an overlap area between the normalized distribution of the first segment and the normalized distribution of the second segment may be calculated. When the overlap area is greater than a predetermined threshold, it is considered that the ego car lane of the static map and the ego car lane of the real-time map are consistent or similar. Of course, in addition to considering $d_1$ and $d_1'$, other segments, such as $d_2$ and $d_2'$, $d_3$ and $d_3'$, $d_4$ and $d_4'$ may also be considered.

Figure 8:
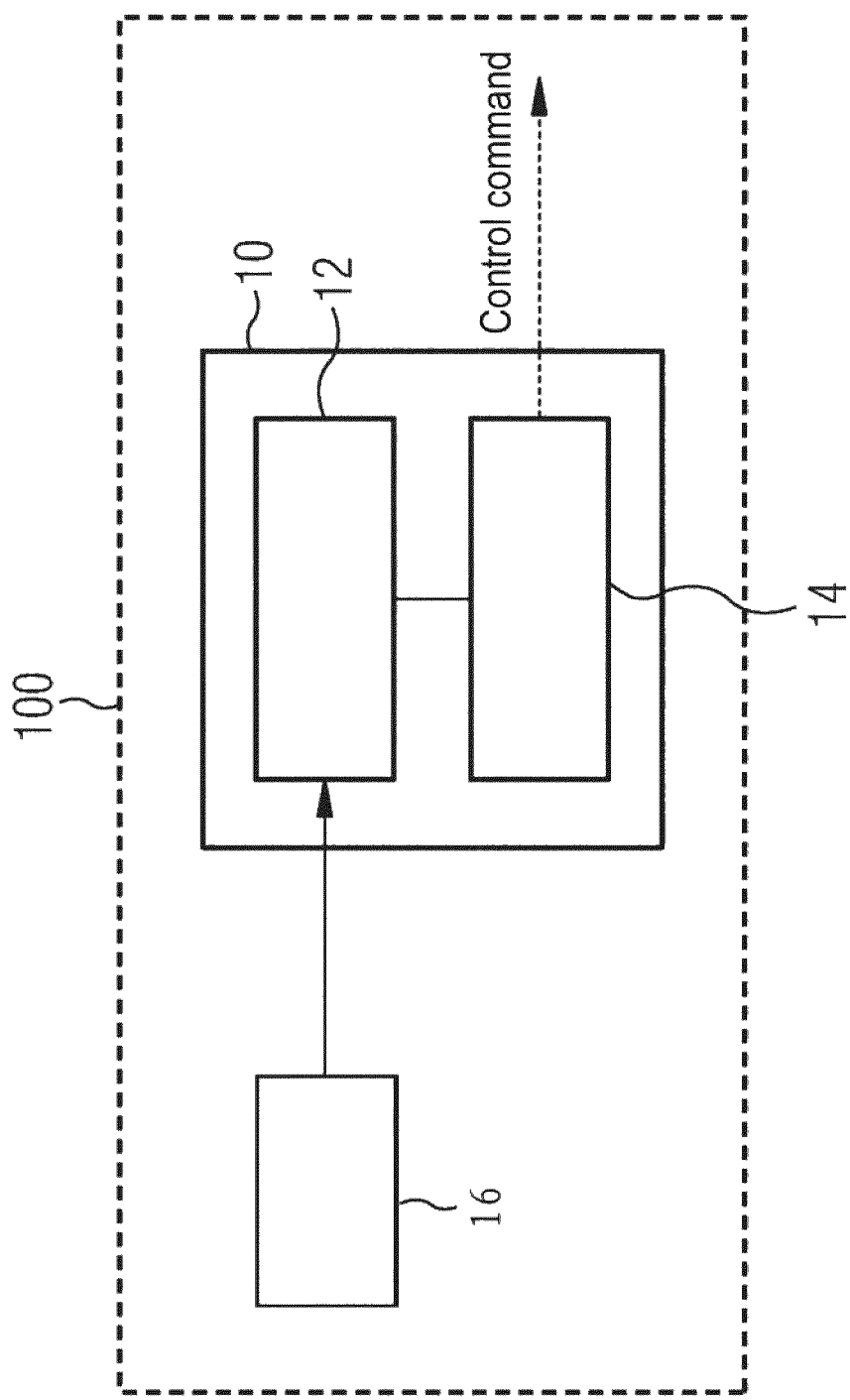
FIG. 8 is an exemplary block diagram of an apparatus for evaluating a map for autonomous driving.

FIG. 8 is an exemplary block diagram of an apparatus 10 for evaluating a map for autonomous driving. The apparatus 10 may be installed in an autonomous driving vehicle 100 (also called an ego car). As shown in FIG. 8, the apparatus 10 includes a storage module 12 and a control module 14. The storage module 12 is configured to store data of a real-time map and a static map. The data of the real-time map and the static map may be originally stored in the storage module 12, or may also be read into the storage module 12 from an external memory 16 via a communication connection. The control module 14 is configured to: acquire pixel points of lane lines of a road in a static map from the storage module; acquire pixels points of lane lines of the road in a real-time map from the storage module; form first fitted curves of the lane lines in the static map by fitting the acquired pixel points of the lane lines in the static map respectively; form second fitted curves of the lane lines in the real-time map by fitting the acquired pixel points of the lane lines in the real-time map respectively; calculate fitted-curve-similarities between the first fitted curves and the corresponding second fitted curves; and evaluate the consistency of the static map and the real-time map based on the fitted-curve-similarities.

According to the present disclosure, the control module 14 may be constructed as any device including a processor and having data processing and analysis functions. For example, the control module 14 may be configured as a processor, or the control module 14 may be configured as a computer, a server or even other smart handheld apparatus 10. The processor may be connected to the storage module via an interconnection bus. The storage module may include a main memory, a read-only memory, and a mass storage device, such as various disk drives, tape drives, and so on. The main memory usually includes a dynamic random-access memory (DRAM) and a cache memory. In operation, the main memory stores at least part of instructions and data for execution by the processor.

In some embodiments, the control module is configured to calculate the fitted-curve-similarity by calculating the parallelism and/or the intersection area between the first fitted curves and the corresponding second fitted curves.

In some embodiments, the control module is configured to calculate the fitted-curve-similarity by calculating the parallelism and/or the intersection area between the first fitted curves and the corresponding second fitted curves.

In some embodiments, the control module is configured to: evaluate lane consistency between a lane, preferably an ego car lane, in the static map and a lane, preferably an ego car lane, in the real-time map, especially consistency of lateral parameters of the lanes, the lateral parameters of the lanes including lateral sizes of the lanes, pixel values and/or numbers of the pixel points of the lanes in a lateral direction, and evaluate the consistency of the static map and the real-time map based on the lane consistency and fitted-curve-similarities.

In some embodiments, the control module may be configured to send a control instruction according to a consistency evaluation result of the static map and the real-time map, and feed the consistency evaluation result back to a static map provider and/or a real-time map provider. The feedback of the consistency evaluation result is beneficial for static map providers and/or real-time map providers to improve map making, thereby promoting technological progress.

In some embodiments, the control module is configured to: determine road sections that are evaluated as inconsistent road sections in the static map and the real-time maps; ascertain the relevance of current autonomous driving plan to the road sections; if the current autonomous driving plan involves the road sections that are evaluated as inconsistent road sections, send a control instruction for adjusting the autonomous driving plan for the ego car based on the ascertained road sections.

The above-mentioned "ascertain the relevance of current autonomous driving plan to the road sections" means that, for example, to determine whether the road sections that are evaluated as inconsistent road sections affect or involve the current driving plan of the vehicle; when a result of the determination is negative, the current driving plan is maintained and the driving plan of the vehicle needs no adjustment; on the contrary, the current driving plan is adapted, such as adjusting the driving plan of the vehicle (such as changing lanes, turning, accelerating or decelerating).

In some embodiments, the control module may be configured to: send a control instruction according to a consistency evaluation result of the static map and the real-time map, the control instruction causing the autonomous driving plan of the ego car to be adapted. As mentioned above, the static map may not be able to present real-time lane information and/or real-time road conditions on a road. Therefore, when the physical properties of the road and/or the real-time road conditions on the road change, it may lead to poor or even dangerous autonomous driving planning. In some embodiments, the changes of the road physical properties may include: lane changes, road curvature changes, road width changes, and/or road slope changes. The real-time road conditions on the road may include: construction sections, traffic jam sections, traffic accident sections and/or road sections in closure. Lane changes include: lane increase, lane reduction, lane separation and/or lane merging. Road curvature changes include: curvature changes of one or more lanes of the road. Road width changes include: width changes of one or more lanes of the road. And the road slope changes include: slope changes of one or more lanes of the road. The real-time map may identify these changes in time, so as to prompt the current driving plan to be adjusted, thereby effectively avoiding potential risks.

The description and drawings merely illustrate the principles of the present disclosure by way of example. In addition, all the examples listed herein are mainly intended to be expressly used for explanatory purposes only to help readers understand the principles of the present disclosure and the concepts contributed by the inventors to improve the prior art. All statements detailing the principles, aspects and examples of the present disclosure herein, and specific examples thereof are intended to include their equivalents.

The functions of the various elements shown in the drawings may be implemented in form of a dedicated hardware, such as "signal provider", "signal processing unit", "processor", "controller", etc., as well as a hardware that may be combined with appropriate software to execute the software. When provided by a processor, these functions may be provided by a dedicated processor, by a shared processor, or by multiple individual processors, and some or all of the multiple individual processors may be shared. However, the term "processor" or "controller" so far is not limited to a hardware that may only execute software, instead, it may include a digital signal processor (DSP) hardware, a network processor, an application specific integrated circuit (ASIC), a field programmable gate array (FPGA), as well as a read-only memory (ROM), a random access memory (RAM) and a non-volatile memory for saving software. Other conventional and/or customized hardware may also be included.

The block diagram may, for example, illustrate a high-level circuit diagram that implements the principles of the present disclosure. Similarly, flow charts, state transition diagrams, pseudo-codes, etc. may represent various processing, operations, or steps. For example, these processing, operations or steps may be substantially represented by a computer-readable medium, so as to be executed by a computer or processor, whether or not such a computer or processor is clearly indicated. The methods disclosed in the specification and claims may be implemented by an apparatus having modules for performing respective actions of these methods.

It should be understood that the disclosure of multiple actions, processes, operations, steps, or functions disclosed in the specification or claims shall not be construed as following a specific order, unless otherwise stated explicitly or implicitly, for example due to technical reasons. Therefore, the disclosure of multiple actions or functions does not limit the multiple actions or functions to a specific order, unless these actions or functions cannot be interchanged due to technical reasons. In addition, in some examples, a single action, function, process, operation, or step may include or be divided into multiple sub-actions, sub-functions, sub-processes, sub-operations, or sub-steps, respectively. Unless expressly excluded, such sub-actions may be included in and be a part of the disclosure of the single action.

Although the exemplary embodiments of the present disclosure have been described, those skilled in the art should understand that various changes and modifications of the exemplary embodiments of the present disclosure may be made without substantially departing from the spirit and scope of the present disclosure. Therefore, all changes and modifications are included in the protection scope defined by the present disclosure.

What is claimed is:
1. A method for autonomous driving, comprising:
controlling, via a vehicle control module, an autonomous driving function of an ego car in accordance with an autonomous driving plan generated based on a static map stored in a memory of the ego car;
acquiring pixel points of lane lines of a road in the static map;
acquiring pixel points of lane lines of the road in a real-time map generated from sensor data captured by one or more sensors of the ego car;
forming first fitted curves of the lane lines in the static map by fitting the acquired pixel points of the lane lines in the static map;
forming second fitted curves of the lane lines in the real-time map by fitting the acquired pixel points of the lane lines in the real-time map;
calculating fitted-curve-similarities between the first fitted curves and the second fitted curves corresponding to the first fitted curves;
evaluating a consistency between the static map and the real-time map based on the fitted-curve-similarities;
adjusting the autonomous driving plan based on evaluation results from the evaluation of the consistency between the static map and the real-time map; and autonomously controlling the ego car, via the autonomous driving function, in accordance with the adjusted autonomous driving plan.

2. The method according to claim 1, wherein calculating the fitted-curve-similarities between the first fitted curves and the corresponding second fitted curves comprises:
calculating parallelisms between the first fitted curves and the corresponding second fitted curves; and/or
calculating intersection areas between the first fitted curves and the corresponding second fitted curves.

3. The method according to claim 1, further comprising:
evaluating lane consistency between an ego car lane in the static map and an ego car lane in the real-time map, wherein the lane consistency includes a consistency of lateral parameters of the ego car lane in the static map and the ego car lane in the real-time map, wherein the lateral parameters include: (a) lateral sizes of the ego car lane in the static map and the ego car lane in the real-time map, and (b) pixel values and/or numbers of the pixel points of the lane lines of the ego car lane in the static map and the ego car lane in the real-time map in a lateral direction; and
evaluating the consistency of the static map and the real-time map based on the lane consistency and the fitted-curve-similarities.

4. The method according to claim 3, wherein evaluating the lane consistency between the ego car lane in the static map and the ego car lane in the real-time map comprises:
determining the ego car lane based on position coordinates of the ego car;
acquiring pixel points of a baseline within the ego car lane in the static map;
calculating first distances from the pixel points of the baseline to the lane line of the ego car lane in the static map in a first direction;
calculating second distances from the pixel points of the baseline to the lane line of the ego car lane in the real-time map in the first direction;
calculating cosine similarity between first vectors constituted by the first distances and second vectors constituted by the second distances; and
evaluating the lane consistency based on the acquired cosine similarity.

5. The method according to claim 4, wherein the baseline is a centerline, and/or the first direction is a normal direction to the baseline.

6. The method according to claim 3, wherein evaluating the lane consistency between the ego car lane in the static map and the ego car lane in the real-time map comprises:
determining the ego car lane based on position coordinates of the ego car;
acquiring pixel points of the ego car lane in the static map;
acquiring pixel points of the ego car lane in the real-time map;
acquiring pixel points of a baseline in the ego car lane in the static map;
determining first segments from the pixel points of the baseline to the lane line of the ego car lane in the static map in a first direction;
determining second segments from the pixel points of the baseline to the lane line of the ego car lane in the real-time map in the first direction;
ascertaining deviations of the pixel values and/or deviations of pixel coordinates between the pixel points in the first segments and the pixel points in the second segments corresponding to the pixel points in the first segments; and
evaluating the lane consistency based on the ascertained deviations.

7. The method according to claim 6, wherein the baseline is a centerline, and/or the first direction is a normal direction to the baseline.

8. The method according to claim 6, wherein acquiring the pixel points of the ego car lane in the real-time map comprises:
extracting the corresponding pixel points from the real-time map based on the pixel coordinates of the pixel points of the ego car lane in the static map, to serve as the pixel points of the ego car lane in the real-time map.

9. The method according to claim 1, further comprising:
processing the real-time map with a clustering process before acquiring the pixels points of the lane lines of the road in the real-time map, so as to classify a part of the pixel points as lane line pixel points while classifying the other part of pixel points as noise pixel points.

10. The method according to claim 1, further comprising:
feeding the evaluation results back to static map providers and/or real-time map providers.

11. The method according to claim 1, wherein adjusting the autonomous driving plan for the ego car based on the evaluation results comprises:
determining road sections that are evaluated as inconsistent road sections in the static map and the real-time map;
ascertaining a relevance of the autonomous driving plan to the inconsistent road sections; and
adjusting the autonomous driving plan for the ego car based on the ascertained relevance, when the autonomous driving plan prior to the adjustment involves the inconsistent road sections.

12. An apparatus for autonomous driving, comprising:
a storage module of an ego car configured to store a real-time map and a static map; and
a vehicle control module operatively configured to:
control an autonomous driving function of the ego car in accordance with an autonomous driving plan generated based on the static map;
acquire pixel points of lane lines of a road in the static map from the storage module;
acquire pixel points of lane lines of the road in the real-time map generated from sensor data captured by one or more sensors of the ego car;
form first fitted curves of the lane lines in the static map by fitting the acquired pixel points of the lane lines in the static map;
form second fitted curves of the lane lines in the real-time map by fitting the acquired pixel points of the lane lines in the real-time map;
calculate fitted-curve-similarities between the first fitted curves and the second fitted curves corresponding to the first fitted curves;
evaluate a consistency between the static map and the real-time map based on the fitted-curve-similarities;
adjust the autonomous driving plan based on evaluation results from the evaluation of the consistency between the static map and the real-time map; and
autonomously control the ego car, via the autonomous driving function, in accordance with the adjusted autonomous driving plan.

13. The apparatus according to claim 12, wherein the control module is configured to:

calculate the fitted-curve-similarities by calculating parallelisms and/or intersection areas between the first fitted curves and the corresponding second fitted curves.

14. The apparatus according to claim 12, wherein the control module is further configured to:
    evaluate lane consistency between an ego car lane in the static map and an ego car lane in the real-time map, wherein the lane consistency includes a consistency of lateral parameters of the ego car lane in the static map and the ego car lane in the real-time map, wherein the lateral parameters include: (a) lateral sizes of the ego car lane in the static map and the ego car lane in the real-time map, and (b) pixel values and/or numbers of the pixel points of the lane lines of the ego car lane in the static map and the ego car lane in the real-time map in a lateral direction; and
    evaluate the consistency between the static map and the real-time map based on the lane consistency and the fitted-curve-similarities.

15. The apparatus according to claim 14, wherein
(i) the control module is further configured to:
    determine the ego car lane by acquiring position coordinates of the ego car;
    acquire pixel points of a baseline within the ego car lane in the static map from the storage module;
    calculate first distances from the pixel points of the baseline to the lane line of the ego car lane in the static map in a first direction;
    calculate second distances from the pixel points of the baseline to the lane line of the ego car lane in the real-time map in the first direction;
    calculate cosine similarities between first vectors constituted by the first distances and second vectors constituted by the second distances; and
    evaluate the lane consistency based on the acquired cosine similarities; and/or
(ii) the control module is further configured to:
    determine the ego car lane by acquiring the position coordinates of the ego car;
    acquire pixel points of the ego car lane in the static map from the storage module;
    acquire pixel points of the ego car lane in the real-time map from the storage module;
    acquire the pixel points of the baseline within the ego car lane in the static map from the storage module;
    determine first segments from the pixel points of the baseline to the lane line of the ego car lane in the static map in the first direction;
    determine second segments from the pixel points of the baseline to the lane line of the ego car lane in the real-time map in the first direction;
    ascertain deviations of the pixel values and/or deviations of pixel coordinates, between the pixel points in the first segment and the pixel points in the second segment corresponding to the pixel points in the first segment; and
    evaluate the lane consistency based on the ascertained deviations.

16. The apparatus according to claim 15, wherein the baseline is a centerline, and/or the first direction is a normal direction to the baseline.

17. The apparatus according to claim 12, wherein the control module is further configured to:
    feed the evaluation results back to static map providers and/or real-time map providers.

18. The apparatus according to claim 12, wherein the control module is further configured to:
    determine road sections that are evaluated as inconsistent road sections in the static map and the real-time map;
    ascertain a relevance of the autonomous driving plan to the inconsistent road sections; and
    send a control instruction that adjusts the autonomous driving plan for the ego car based on the ascertained relevance, when the autonomous driving plan prior to the adjustment involves the inconsistent road sections.

19. A vehicle comprising the apparatus according to claim 12, wherein the vehicle is the ego car.

20. A computer product comprising a non-transitory computer-readable storage medium having stored thereon computer-executable instructions which, when executed by one or more computing devices, configures the one or more computing devices to perform a method comprising:
    controlling an autonomous driving function of an ego car in accordance with an autonomous driving plan generated based on a static map stored in a memory of the ego car;
    acquiring pixel points of lane lines of a road in the static map;
    acquiring pixel points of lane lines of the road in a real-time map generated from sensor data captured by one or more sensors of the ego car;
    forming first fitted curves of the lane lines in the static map by fitting the acquired pixel points of the lane lines in the static map;
    forming second fitted curves of the lane lines in the real-time map by fitting the acquired pixel points of the lane lines in the real-time map;
    calculating fitted-curve-similarities between the first fitted curves and the second fitted curves corresponding to the first fitted curves;
    evaluating a consistency between the static map and the real-time map based on the fitted-curve-similarities;
    adjusting the autonomous driving plan based on evaluation results from the evaluation of the consistency between the static map and the real-time map; and
    autonomously controlling the ego car, via the autonomous driving function, in accordance with the adjusted autonomous driving plan.

* * * * *